UNITED STATES PATENT OFFICE.

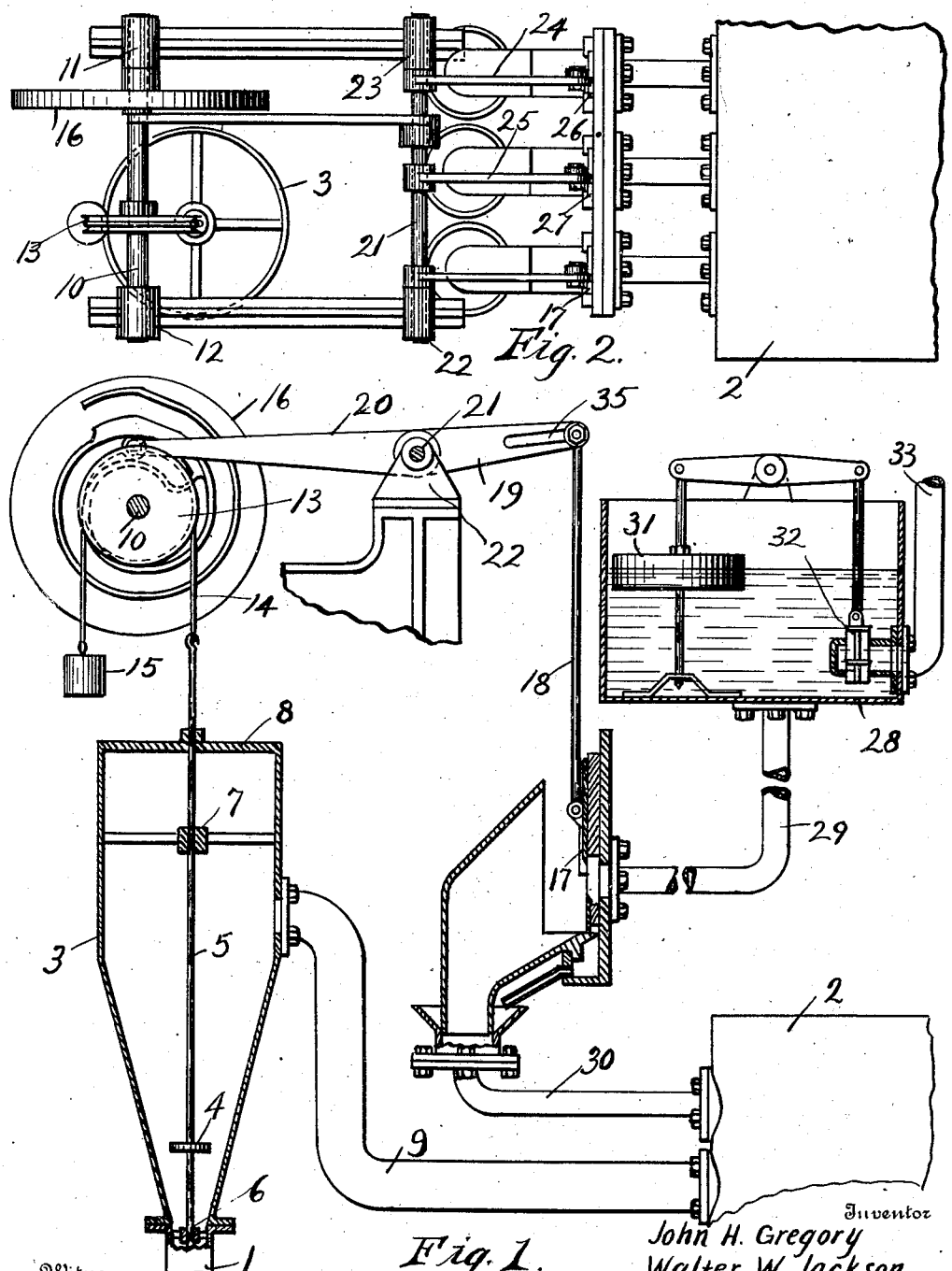

JOHN H. GREGORY AND WALTER W. JACKSON, OF COLUMBUS, OHIO, AND FREDERICK N. CONNET, OF PROVIDENCE, RHODE ISLAND, ASSIGNORS TO BUILDERS IRON FOUNDRY, OF PROVIDENCE, RHODE ISLAND, A CORPORATION.

AUTOMATIC FLOW-REGULATOR FOR LIQUIDS AND GASES.

No. 857,343.  Specification of Letters Patent.  Patented June 18, 1907.

Application filed July 6, 1905. Serial No. 268,376.

*To all whom it may concern:*

Be it known that we, JOHN H. GREGORY and WALTER W. JACKSON, both of the city of Columbus, county of Franklin, and State of Ohio, and FREDERICK N. CONNET, of the city and county of Providence and State of Rhode Island, all citizens of the United States, have invented certain new and useful Improvements in Automatic Flow-Regulators for Liquids and Gases, of which the following is a specification, reference being had therein to the accompanying drawing.

This invention relates to means whereby the velocity of certain liquids or gases passing through a given aperture automatically controls the flow of certain other liquids or gases.

The object of the invention is to provide a device that will be operated by the flow of liquids or gases through a given aperture, said flow to operate a valve the movement of which valve in turn to operate one or more gates to allow a proportional flow of other chemicals or gases.

This device is more particularly designed to operate in connection with a city water supply where the water possesses certain impurities that are to be precipitated by means of chemicals deposited in the water for that purpose. These chemicals may be supplied from any number of tanks discharging into the water in quantities proportioned to the amount of water used, and this supply is governed automatically by the velocity of the inflowing water. To accomplish this purpose, a chamber has been provided with a valve to control the inlet to said chamber, said valve being actuated by the force of the inflowing liquid to be raised and opened an amount in proportion to the pressure or velocity of the flow, and this valve in turn is arranged through suitable mechanism to control the opening and closing of the chemical supply gates.

This invention is not confined to controlling the flow of chemicals by the flow of liquids, as by its use the flow of liquids may be made to control the flow of gases, or the flow of gases may control the flow of liquids, or again the flow of gases may control the flow of gases or a combination of gases and liquids, any of which may be subsequently mixed together in any predetermined proportions if desired; broadly speaking, our invention covers the automatic controlling of the flow of any gases or liquids by the flow of other gases or liquids.

The invention consists of other novel features and parts and combinations of the same as will be fully described hereinafter and then pointed out in the appended claims.

A practical embodiment of the invention is represented in the accompanying drawings, forming a part of this specification, in which similar characters of reference indicate corresponding parts in all the views.

In the drawings: Figure 1—is a side elevation of the device illustrating an operating arrangement of the mechanism with portions broken away to better illustrate the action of the same. Fig. 2—is a plan view of the device with the three chemical tanks removed, showing the chemical inlet gates and the pipe connection from said gates to the mixing tank.

Although the device may be operated by the flow of any liquids or gases to control the flow of other liquids or gases, we will first describe the same as being operated by the flow of water through the main tube to automatically control the flow of a plurality of different chemicals all to be subsequently deposited into a common reservoir for the purpose of precipitating the impurities in the water.

Referring to the drawings at 1 is the main inlet pipe through which the water flows to the mixing receptacle or reservoir 2.

At 3 is a valve chamber having its lower portion tapered to better regulate the area of the inlet opening which opening is controlled by the disk valve 4. This valve is preferably fixed to an upright stem 5 and depends on gravity to close it, said stem works vertically in bearings 6 and 7 and extends out through the upper end of the chamber. As the water enters through the inlet pipe 1 it strikes against the disk valve 4 which allows said water to pass through the chamber and out through pipe 9 into the reservoir. A horizontal shaft 10 is mounted above this chamber 3 to turn freely in bearings 11 and 12 and on this shaft is fixed the sheave 13 to which is secured a wire 14 or other flexible connection to the valve stem 5. A counterbalance weight 15 also acts on this sheave to rotate the shaft when the valve 4 rises. At 16 is a large cam also fixed on shaft 10, said cam being caused to rotate by the movement of valve 4 and by the movement of this cam the gate 17 is opened and closed through the connection 18, arm 19 and lever 20, and the height to which this gate may be raised is regulated by adjusting the connection in the slotted arm 19. When it is desired to operate more than one gate from this cam the shaft 21 may be mounted in bearings 22 and 23 and to it may be secured any additional number of arms to operate as many gates the same as arms 24 and 25, see Fig. 2, operate the gates 26 and 27.

At 28 is a chemical tank located in any convenient place and arranged to deposit its contents into the mixing reservoir 2 through the pipes 29 and 30, the quantity of the flow being controlled by the movement of the gate 17. At 31 is a float in said chemical tank which actuates the inlet valve 32 to automatically maintain a given head in said tank by controlling the inflow through the inlet pipe 33. Any desired number of these chemical tanks may be used and operated by the mechanism shown and described.

When gas is forced through the main supply 1 its action on the valve 4 is much the same as that of a liquid, and at such a time a head 8 is used to close the upper end of the chamber 3 to confine the flow to pipe 9. In place of chemical tanks, gas receptacles may be used to supply gases instead of chemicals if desired, or a combination of gas and chemical receptacles to supply either one or both to be mixed together in any predetermined quantities or subsequently mixed with the gases or liquids in the reservoir 2.

The operation of the device may be further described as follows: When there is no flow through the main supply pipe 1 the valve 4 falls by its own gravity and rests upon its seat at the lower end of the tapered portion closing the inlet and when in this position the cam 16 is rotated to close the gate 17 to shut off the auxiliary supply. When gas or liquids are allowed to flow through the main they strike the underside of the valve disk 4 and raise it from its seat, the greater the velocity of the flow the higher the valve disk is carried, and owing to the tapered form of the chamber the area of the opening around the disk gradually increases as the valve rises therefore as this disk is free to be actuated by the flow it will be raised in direct proportion to the pressure or quantity passing through said main. As the valve disk rises and the weight 15 drops the mechanism described above opens the gate 17 to admit a proportional flow from the auxiliary supply, and as the pressure drops a reverse action takes place closing down the auxiliary flow to the required amount.

An essential feature of the device is that the flow through the main supply pipe not only actuates mechanism to automatically admit a quantity of other liquids or gases but that this flow so controls and regulates said liquids and gases that they will always be in a predetermined ratio to the amount passing through the main pipe and will increase and decrease in direct proportion to the increase and decrease of the flow through said main.

Our invention is not restricted to the construction and arrangement of parts herein shown and described nor to the various details thereof, as the same may be modified in various particulars without departing from the spirit and scope of our invention, one practical embodiment of which has been herein illustrated and described without attempting to show all of the various forms and modifications in which our invention might be embodied.

Having thus described our invention, what we claim as new and desire to secure by Letters Patent, is:

1. A device for supplying liquids or gases, comprising a main supply pipe, an auxiliary supply pipe, a valve controlling the flow from said latter pipe, and means actuated by the velocity of flow through said main to regulate the amount of opening of said valve and so automatically regulate the flow from said supply pipe.

2. In a device for supplying liquids or gases, a main supply pipe, an auxiliary supply vessel, an auxiliary valve to control the flow from said vessel, a main valve actuated by the velocity of flow through said main pipe, and means whereby the movement of said main valve will regulate the amount of opening of said auxiliary valve to automatically regulate the supply from said auxiliary vessel.

3. A device for supplying liquids or gases, comprising a main supply pipe, a chamber communicating with said pipe, an auxiliary supply vessel, an auxiliary valve to control the flow from said vessel, a valve in said chamber actuated by the velocity of flow through said main pipe, and means whereby the movement of said latter valve will regulate the amount of opening of said auxiliary valve to automatically control the supply from said auxiliary vessel.

4. A device for supplying liquids or gases comprising a main supply pipe, a chamber communicating with said pipe, an auxiliary supply vessel, an auxiliary valve to control the flow from said vessel, a valve in said chamber and adapted to be moved a distance proportionate to the velocity of the flow therethrough, and means whereby the movement of said main valve will regulate the amount of opening of said auxiliary valve to automatically control the supply from said auxiliary vessel.

5. In a device of the character described, a main supply pipe, a valve chamber communicating with said pipe, an auxiliary supply vessel, a gate to control the flow from said vessel, a valve in said chamber adapted to be moved a distance proportionate to the velocity of the flow therethrough, and means whereby the movement and position of said valve will move and determine the position of said gate so that the quantity drawn from said chamber will be automatically proportioned to the quantity passing through the main pipe.

6. In a device for supplying liquids or gases, a main supply pipe, an auxiliary supply pipe, a valve chamber, a valve capable of being raised by the flow into said chamber, and means including a tapered portion in said chamber whereby said valve will be raised in a predetermined ratio to the velocity of the flow through said main and means operated by the action of said valve to control the flow from said auxiliary supply.

7. In a device for supplying liquids or gases, a main supply pipe, a valve, a valve chamber provided with a tapering portion in which said valve works, said chamber communicating with said supply pipe, an auxiliary supply vessel, said valve arranged to be raised by the pressure in the main pipe, and means controlled by the working of said valve to operate gates and automatically regulate the flow from the said auxiliary supply.

8. In a device for supplying liquids or gases, a main supply pipe, an auxiliary supply vessel, a chamber connected to said supply pipe through which chamber the contents of said main supply pipe pass, a valve operated by the flow through said chamber, and means whereby the action of said valve operates a rotatable cam to open and close gates and automatically regulate the flow from the auxiliary supply.

9. In a device for supplying liquids or gases, a main supply pipe, an auxiliary pipe, a valve, a valve chamber provided with a tapered portion in which said valve works, said chamber being connected to said main pipe so that the contents of said pipe must flow through said tapered portion, said valve being arranged to rise a distance in proportion to the velocity of the flow and means including a rotatable cam to operate gates and automatically control the flow from said auxiliary supply so that the quantity drawn from the latter will always be proportioned to the quantity passing through said main.

In testimony whereof we affix our signatures in presence of two witnesses.

JOHN H. GREGORY.
WALTER W. JACKSON.
FREDERICK N. CONNET.

Witnesses to J. H. G. & W. W. J.:
  J. WM. LINK,
  L. K. ROWLEY.

Witnesses to Frederick N. Connet:
  ELLIOTT F. ALDRICH,
  H. J. BURROUGH.